US012709098B2

(12) United States Patent
Fukasawa et al.

(10) Patent No.: US 12,709,098 B2
(45) Date of Patent: Aug. 18, 2026

(54) LIQUID EJECTION HEAD AND LIQUID EJECTION DEVICE

(71) Applicant: RISO Technologies Corporation, Tokyo (JP)

(72) Inventors: Masato Fukasawa, Fuji Shizuoka (JP); Ryutaro Kusunoki, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 137 days.

(21) Appl. No.: 18/664,103

(22) Filed: May 14, 2024

(65) Prior Publication Data

US 2025/0050638 A1 Feb. 13, 2025

(30) Foreign Application Priority Data

Aug. 10, 2023 (JP) ................................ 2023-131374

(51) Int. Cl.
*B41J 2/14* (2006.01)

(52) U.S. Cl.
CPC .... *B41J 2/1433* (2013.01); *B41J 2002/14411* (2013.01)

(58) Field of Classification Search
CPC ....................... B41J 2/1433; B41J 2002/14411
See application file for complete search history.

(56) References Cited

U.S. PATENT DOCUMENTS 8,123,337 B2 2/2012 Drury
8,523,332 B2 9/2013 Drury
9,421,768 B2 8/2016 Shimosato
9,561,652 B2 2/2017 Shimosato
2021/0070042 A1* 3/2021 Xu ........................ B41J 2/1433

FOREIGN PATENT DOCUMENTS

EP 2703164 A2 3/2014
EP 4186703 A1 5/2023
JP 2010234539 A 10/2010
JP 2011062867 A * 3/2011

OTHER PUBLICATIONS

Extended European Search Report dated Nov. 12, 2024, mailed in counterpart European Application No. 24181541.4, 6 pages.

* cited by examiner

*Primary Examiner* — Jason S Uhlenhake
(74) *Attorney, Agent, or Firm* — Kim & Stewart LLP

(57) ABSTRACT

According to an embodiment, a liquid ejection head includes a nozzle plate with a plurality of nozzles. A plurality of actuator grooves form a plurality of pressure chambers that are respectively fluidly connected to the nozzles. The actuator grooves are spaced from one another in a first direction parallel to the nozzle plate. A common flow channel is adjacent to open ends of the actuator grooves in a second direction parallel to the nozzle plate and perpendicular to the first direction. A liquid supply opening is fluidly connected to the common flow channel. The nozzle plate is a flexible film having a Young's modulus greater than or equal 9.1 gigapascals (GPS). Such an arrangement can help mitigate a water hammer effect experienced in liquid ejection heads.

17 Claims, 7 Drawing Sheets

LIQUID EJECTION HEAD AND LIQUID EJECTION DEVICE

CROSS-REFERENCE TO RELATED APPLICATION

This application is based upon and claims the benefit of priority from Japanese Patent Application No. 2023-131374, filed Aug. 10, 2023, the entire contents of which are incorporated herein by reference.

FIELD

The present disclosure relates to a liquid ejection head and a liquid ejection device.

BACKGROUND

In a liquid ejection device, such as an inkjet printer, high productivity generally requires smaller sizes in the liquid ejection head but larger ejection volumes. Some liquid ejection devices adopt a structure in which ink (liquid) is supplied from both sides of an actuator groove in an inkjet head to provide a high ink flow rate for high productivity. Such a structure is referred to as a side-shoot type. Generally, the size of the ink flow channel for supplying the ink is restricted in order to reduce the overall size of the liquid ejection head. Additionally, a water hammer phenomenon, depending on the size of the ink flow channel, is known to occur when switching from a high ink flow rate through the head to a low ink flow rate. This phenomenon can affect the stability in the ejection nozzle meniscus that is necessary for stable ejection in some cases.

A liquid ejection head and a liquid ejection device capable of preventing, avoiding, or mitigating the water hammer phenomenon would be desirable.

DETAILED DESCRIPTION

According to one embodiment, a liquid ejection head includes a nozzle plate, a plurality of nozzles in the nozzle plate, and a plurality of actuator grooves forming a plurality of pressure chambers that are respectively fluidly connected to the plurality of the nozzles. The actuator grooves are spaced from one another in a first direction parallel to the nozzle plate. A common flow channel is adjacent to open ends of the actuator grooves in a second direction parallel to the nozzle plate and perpendicular to the first direction. A liquid supply opening is fluidly connected to the common flow channel. The nozzle plate is a flexible film having a Young's modulus equal to or higher than 9.1 gigapascals (GPS).

According to another embodiment, a liquid ejection head includes a nozzle plate and a liquid flow channel. The nozzle plate has a nozzle. The liquid flow channel includes a plurality of actuator grooves forming pressure chambers respectively communicated with a plurality of the nozzles, one or more common flow channels which extend in a first direction, and which are communicated with the plurality of actuator grooves, and a supply opening supplied with a liquid. When a thickness of the nozzle plate is T mm, a relationship between a maximum supply distance L mm as a distance in the first direction from a supply part where the liquid is supplied to the common flow channel to farthest one of the actuator grooves in the common flow channel, and a flow channel width W mm as a dimension in a second direction crossing the first direction of the common flow channel satisfies the relationship:

$$L \geq (-372.02\,T + 26.0415)\,W^2 + (47.616\,T - 4.7618)\,W + 7.1429$$

Figure 1:
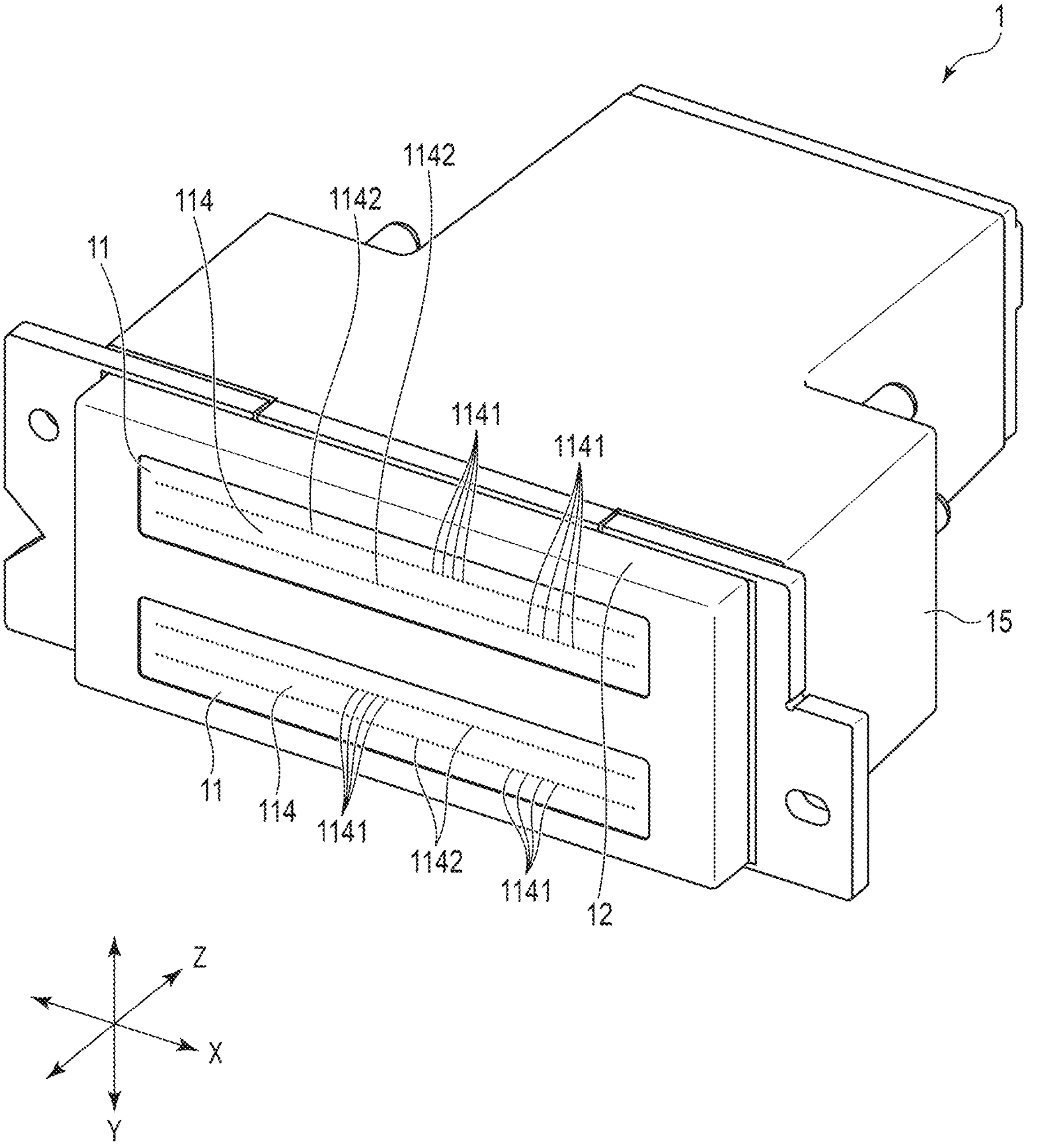
FIG. 1 depicts a liquid ejection head according to a first embodiment.
Figure 2:
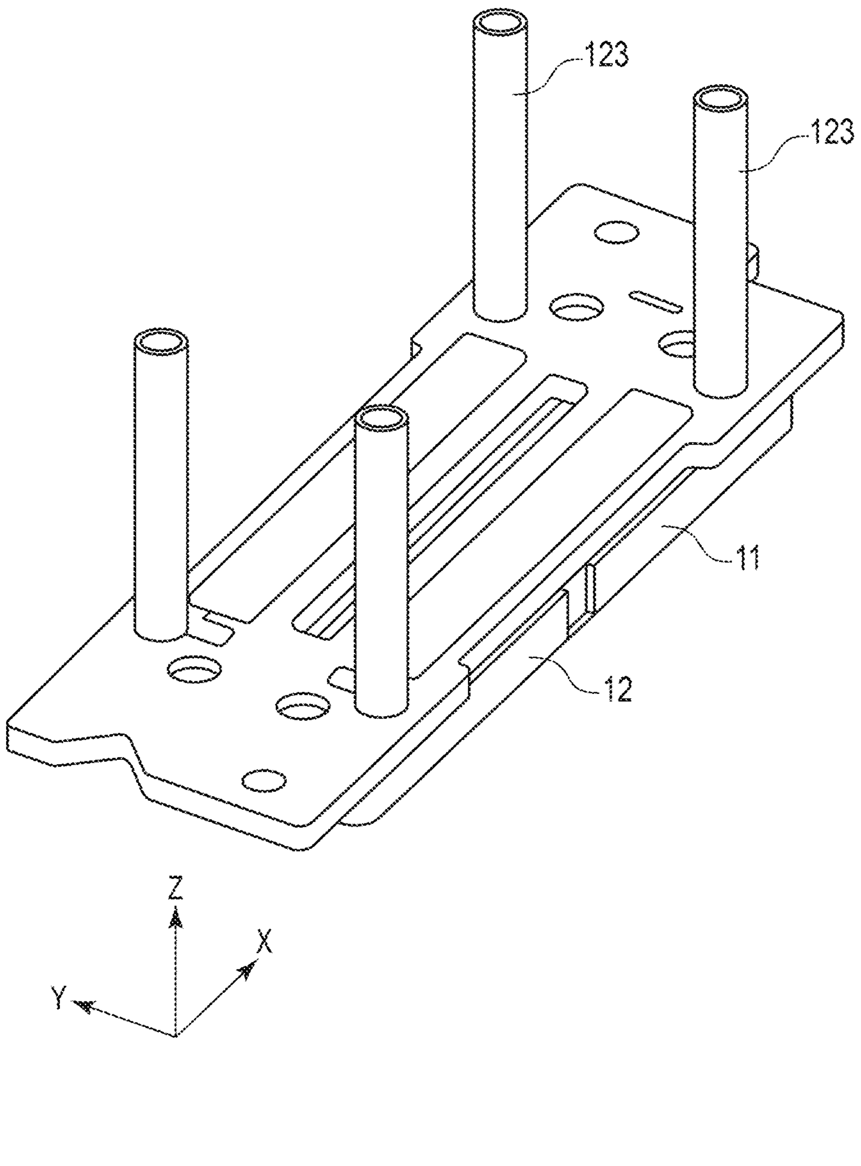
FIG. 2 depicts a head main body.
Figure 3:
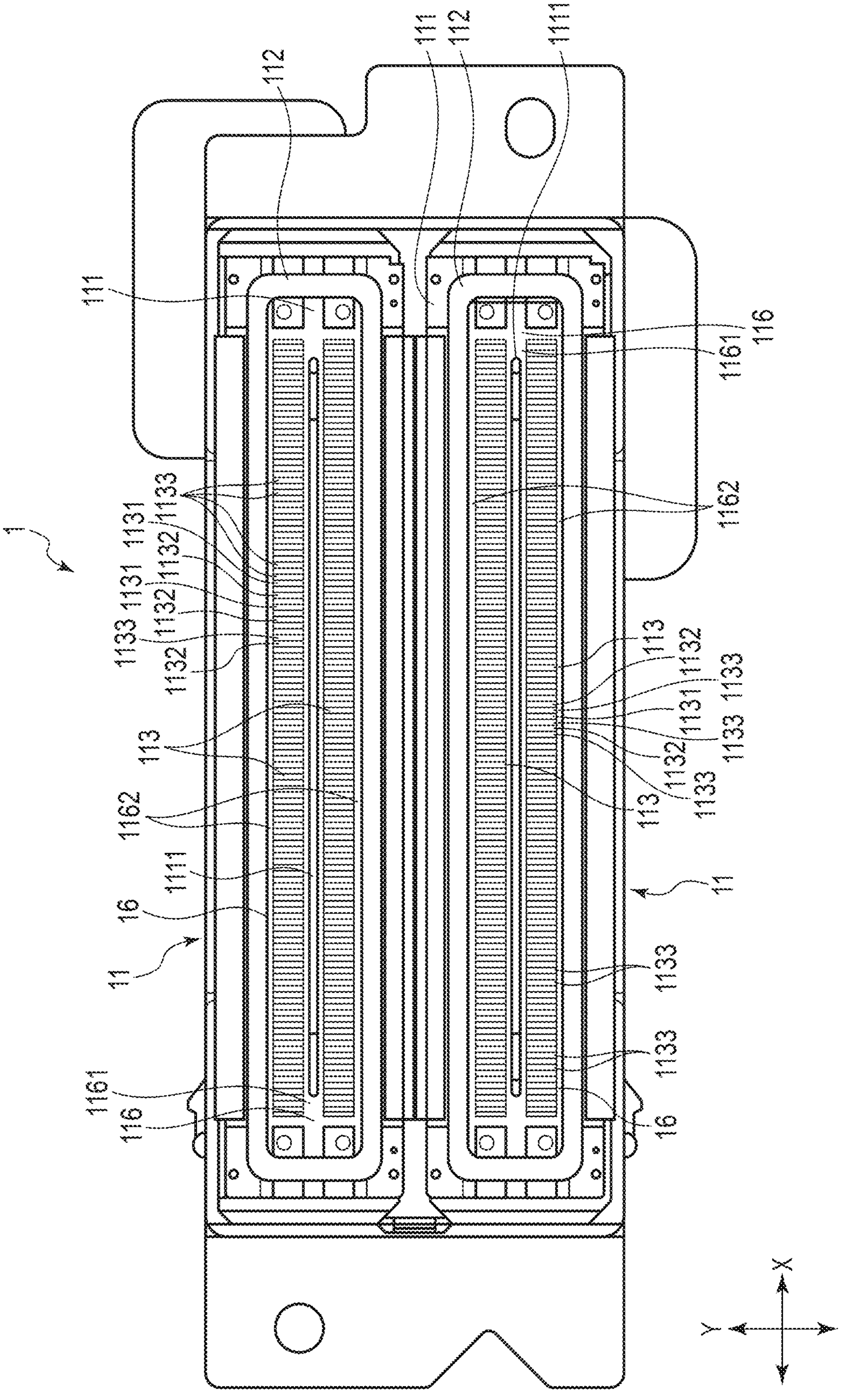
FIG. 3 is a bottom view of a liquid ejection head.
Figure 4:
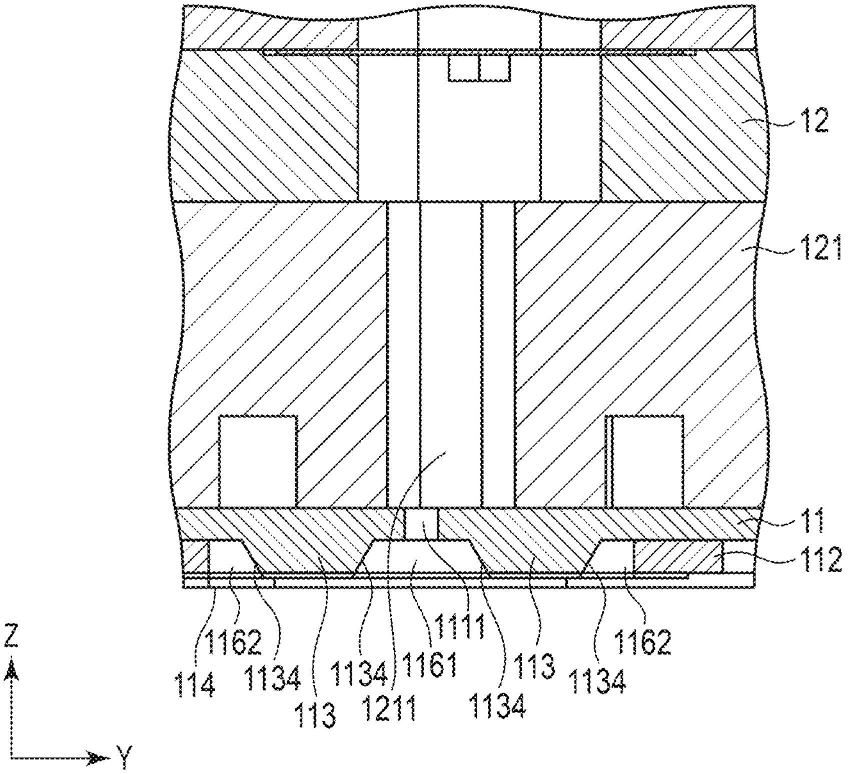
FIG. 4 is a cross-sectional of a part of a liquid ejection head.
Figure 5:
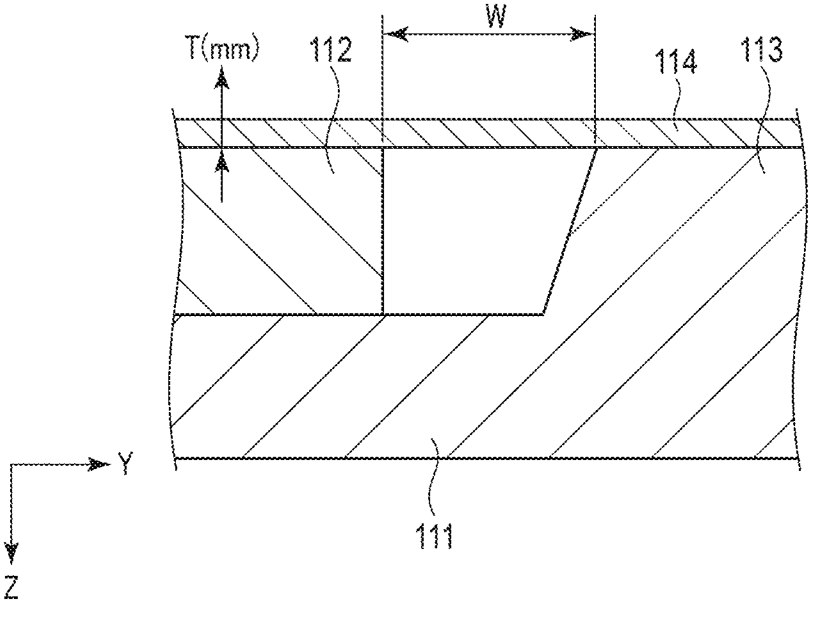
FIG. 5 is a cross-sectional view of a part of a liquid ejection head.
Figure 6:
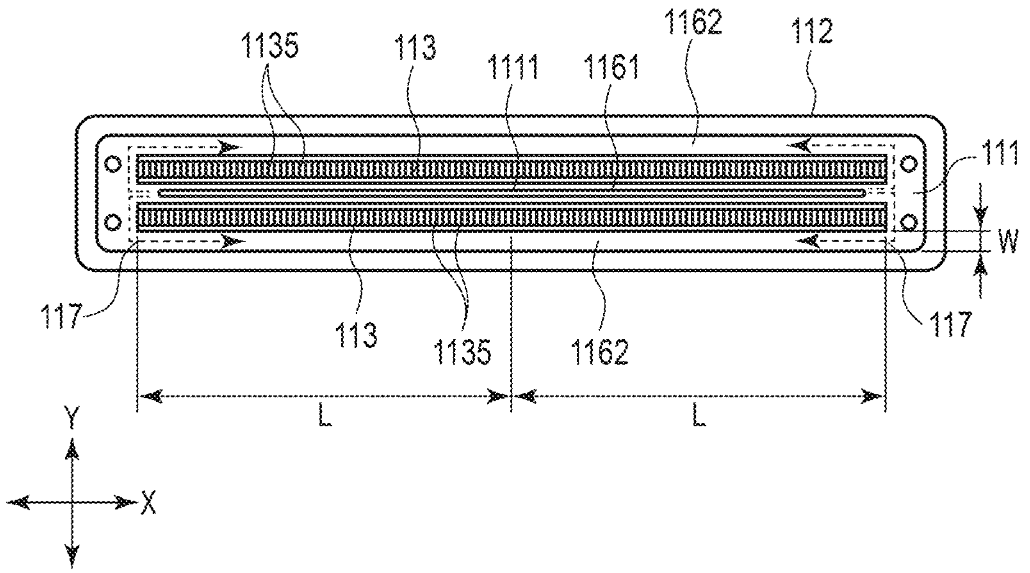
FIG. 6 is a cross-sectional view of a part of a liquid ejection head.
Figure 7:
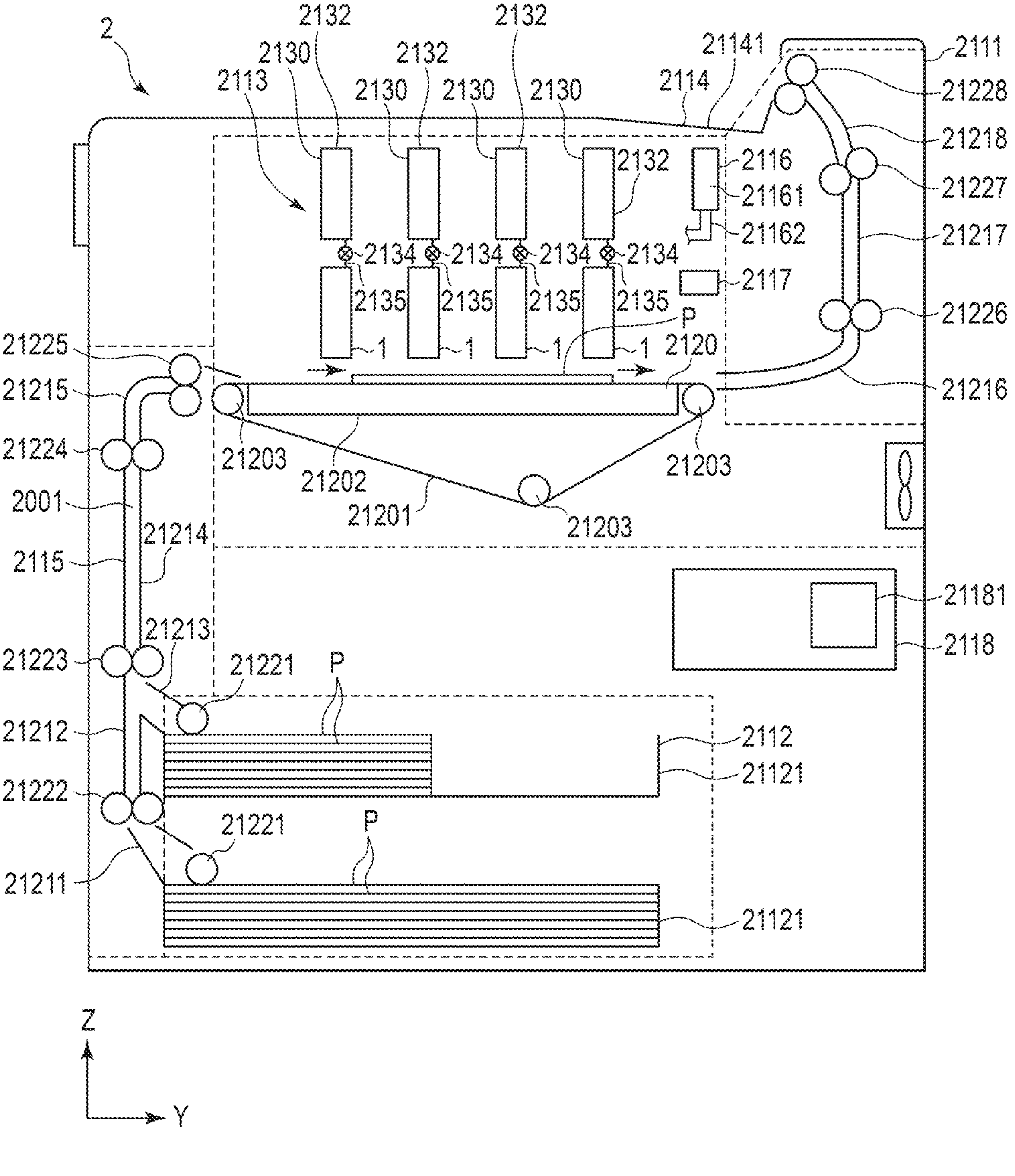
FIG. 7 depicts a liquid ejection device according to an embodiment.

A liquid ejection head 1 and a liquid ejection device 2 incorporating the liquid ejection head 1 will hereinafter be described with reference to FIG. 1 through FIG. 7 as a first embodiment. FIG. 1 is a perspective view showing a configuration of the liquid ejection head 1, and FIG. 2 is a perspective view showing a configuration of a head main body 11. FIG. 3 is a bottom view showing the configuration of the liquid ejection head 1, and FIG. 4 is a cross-sectional view showing a configuration of a part of the liquid ejection head 1. FIG. 5 is a cross-sectional view showing a configuration of another part of the liquid ejection head 1, and FIG. 6 is an explanatory diagram showing depicting aspects of a flow channel of the liquid ejection head 1. FIG. 7 depicts a configuration of the liquid ejection device 2 according to an embodiment. It should be noted that aspects depicted in the figures are not necessarily to scale and dimensions and the like may be shown with expansion or contraction as appropriate in the drawings for the sake of convenience of explanation. Likewise, aspects or components may be omitted from the depictions in drawings for representational clarity of certain other aspects or components.

The liquid ejection head 1 is, for example, a shear-mode inkjet head disposed in a liquid ejection device 2, such as an inkjet recording device depicted in FIG. 7. The liquid ejection head 1 has, in this example, an independent drive structure provided with pressure chambers 1131 and air chambers 1132 arranged alternately. The liquid ejection head 1 can be disposed in a head unit 2130 including a supply tank 2132 provided in or installable within the liquid ejection device 2.

The liquid ejection head 1 is supplied with the ink (liquid) from the supply tank 2132. It should be noted that the liquid ejection head 1 in some examples may be a noncyclic (non-circulating) type head through which the ink does not recirculate to the supply tank 2132, or may be a cyclic (circulating) type head through which the ink which is not ejected is returned (recirculated) to the supply tank 2132 or the like. In the present embodiment, the liquid ejection head 1 is a noncyclic type head as a non-limiting example.

As shown in FIG. 1 through FIG. 7, the liquid ejection head 1 is provided with two head main bodies 11, a manifold unit 12, and a cover 15. In some examples, the liquid ejection head 1 can be a four-column integral structure head of a side-shoot type including two head main bodies 11, each including a pair of actuators 113.

The head main body 11 ejects a liquid. The head main body 11 has a substrate 111, a frame body 112, actuators 113, and a nozzle plate 114. Each of the actuators 113 includes a plurality of pressure chambers 1131 and a plurality of air chambers 1132. Inside a head main body 11, an ink flow channel 16 is formed that passes through the pressure chambers 1131 connected with nozzles 1141. The ink flow channel 16 is also referred to as a liquid flow channel.

Each head main body 11 has a common flow channel unit 116 connected to the pressure chambers 1131 of the pair of actuators 113. The common flow channel unit 116 is a part of the ink flow channel 16. In this context, a primary (first) side of the plurality of pressure chambers 1131 refers to an upstream side relative to a direction in which the liquid flows in the head main body 11. A secondary (second) side of the plurality of pressure chambers 1131 refers to a downstream side relative to the direction in which the liquid flows.

Further, the head main body 11 has an electrode part formed of an electrode film provided to the substrate 111 and connected to the actuators 113. Specifically, as the electrode part, the head main body 11 includes a plurality of individual electrodes for respectively driving individual pressure chambers 113 in the plurality of pressure chambers 1131 in the actuators 113, and a single common (shared) electrode or otherwise a plurality of common electrodes connected to the plurality of pressure chambers 1131.

In present embodiment, each head main body 11 has two actuators 113, and the common flow channel unit 116 has a single first common flow channel 1161 and two second common flow channel units 1162 (one for each actuator 113 of the head main body 11). The common flow channel unit 116 includes the first common flow channel 1161 communicating with inflow (primary side) openings of the pressure chambers 1131 (entrances of the pressure chambers 1131) and the second common flow channels 1162 that communicate with outflow openings of the pressure chambers 1131 (exits of the pressure chambers 1131) at the secondary sides of the actuators 113.

In other words, the first common flow channel 1161 is disposed at one end in the Y direction) of each of the actuator grooves 1135 that each extend in the Y direction. One of the second common flow channels 1162 is disposed at the other end of the each of the actuator grooves 1135. Since there are a pair of actuators 113 in this example, there are two second common flow channels 1162 for each head main body 11. The first common flow channel 1161 and the second common flow channels 1162 are flow connected with each other at both X direction end portions of the head main body 11.

The substrate 111 is formed to have a rectangular plate shape. The substrate 111 can be a ceramics material such as alumina. The substrate 111 is formed to have, for example, a rectangular shape longer in one direction (X direction) than the other direction (Y direction). The electrode film is formed on a principal (first) surface at one side of the substrate 111. The pair of actuators 113 are disposed on the substrate 111 side by side in a short-side direction (the Y direction) of the substrate 111. The substrate 111 has a supply opening 1111 as an opening through which the liquid passes when being supplied. The supply opening 1111 is a through hole penetrating the substrate 111.

It should be noted that a back surface of the substrate 111 faces, when assembled, a manifold 121 and covers a groove in the facing surface of the manifold 121. The groove thus formed is used as a cooling flow channel through which cooling water can flow. In other words, the substrate 111 forms a cooling flow channel together with the manifold 121.

The supply opening 1111 is an entrance for supplying the ink (liquid) to the first common flow channel 1161. The supply opening 1111 is a through hole formed at a position at the center (middle) in the short-side direction of the substrate 111. The supply opening 1111 also extends along a longitudinal direction of the substrate 111. In other words, the supply opening 1111 is, for example, an elongated hole long in the corresponding longitudinal direction of the actuators 113 and the first common flow channel 1161. The supply opening 1111 is disposed between the pair of actuators 113, and opens at a position opposed to the first common flow channel 1161. A part of the common electrode may be formed on an inner wall surface of the supply opening 1111.

The actuators 113 and the frame body 112 are disposed on the substrate 111. An inside of the frame body 112 in the substrate 111 forms a liquid contact area to which the ink is delivered, and an outside of the frame body 112 forms a mounting area to which a variety of electronic components can be coupled.

The frame body 112 is fixed to the substrate 111 with an adhesive or the like. The frame body 112 surrounds the support opening 1111 of the substrate 111 and the actuators 113.

For example, the frame body 112 is formed to have a rectangular frame shape. The frame body 112 may have a step structure in which a part of its surface is recessed. The pair of actuators 113 and the supply opening 1111 are arranged in the opening of the frame body 112. The frame body 112 is configured to surround the periphery of the actuators 113 between the nozzle plate 114 and the substrate 111 to be able to hold liquid inside. In other words, the frame body 112, the nozzle plate 114, the substrate 111, and the actuators 113 form ink flow channels including the pressure chambers 1131 and the common flow channels 1161, 1162 in the head main body 11.

The pair of actuators 113 are bonded to the surface of the substrate 111. The pair of actuators 113 are disposed on the substrate 111 in two rows, one on each side of the supply opening 1111. Each actuator 113 is a plate like member elongated in one direction. The actuators 113 are arranged in the opening of the frame body 112 and are bonded to the surface of the substrate 111.

The actuators 113 each have a plurality of pressure chambers 1131 arranged in the longitudinal direction at regular intervals in the longitudinal direction, and a plurality of air chambers 1132 which are also arranged in the longitudinal direction at regular intervals, such that each air chamber 1132 is disposed between a pair of pressure chambers 1131 otherwise adjacent to each other. In other words, the plurality of pressure chambers 1131 and the plurality of air chambers 1132 are alternately arranged along the longitudinal direction of the actuator 113. The pressure chambers 1131 and the air chambers 1132 themselves extend lengthwise in the width direction (short-side direction) of the actuator 113.

A top surface of the actuator 113, which is the surface facing away from the substrate 111 is bonded to the nozzle plate 114. The actuator 113 is provided with a plurality of actuator grooves 1135 which are arranged in the longitudinal direction at regular intervals, and which extend along a direction perpendicular to the longitudinal direction. The plurality of actuator grooves 1135 forms the plurality of pressure chambers 1131 and the plurality of air chambers 1132. In other words, the actuator 113 comprises a plurality of piezoelectric bodies 1133 (functioning as drive elements) forming the walls of the actuator grooves 1135. The plurality of pressure chambers 1131 and the plurality of air chambers 1132 are in the spaces between piezoelectric bodies 1133 adjacent to each other. The piezoelectric bodies 113 operate to change the volumes of the pressure chambers 1131 in response to the application of drive voltages.

In the actuator 113, the width in the short-side direction may gradually increase toward the substrate 111 from the top portion. A cross-sectional shape of the actuator 113 is has a trapezoidal shape. In other words, the actuator 113 has tilted surfaces 1134 which are tilted (angled) in the short-side direction. The side surface portions (the tilted surfaces 1134) face the first common flow channel 1161 and the second common flow channels 1162. The electrode films are formed with predetermined patterns on the tilted surfaces 1134.

In a specific example, the actuator 113 is formed by laminated piezoelectric of layers opposite polarization directions. In this context, the piezoelectric material used for the layers can be, for example, lead zirconate titanate (PZT). The actuators 113 are bonded to the surface of the substrate 111 with an adhesive or the like. Further, the actuator 113 has the tilted surfaces 1134. In the actuator 113, the plurality of actuator grooves 1135 are formed, and the piezoelectric bodies 1133 (the drive elements) which are sidewalls for separating the actuator grooves 1135 can be formed by dividing the laminated layers into separate portions/bodies.

Further, the actuator 113 is provided with the electrode films forming the individual electrodes and the common electrode formed with the predetermined patterns.

The pressure chambers 1131 deform to thereby eject the ink from the nozzles 1141 for an operation such as printing by the liquid ejection head 1. An entrance of each pressure chamber 1131 opens on the first common flow channel 1161, and an exit of the pressure chamber 1131 opens on a second common flow channel 1162. The ink inflows from the entrance outflows from the exit of the pressure chamber 1131. It should be noted that the pressure chamber 1131 may have a configuration in which the ink inflows from the both openings described above as the entrance and the exit. The portions of the individual electrodes are respectively formed inside the actuator grooves 1135 which form the pressure chambers 1131.

The entrance side and the exit side of each air chamber 1132 is blocked by liquid-proof walls formed from photosensitive resin or the like. The air chamber 1132 is thus not fluidly connected to the first common flow channel 1161 and the second common flow channel 1162. The liquid-proof wall of the air chamber 1132 can be formed by injecting an ultraviolet curable resin into an actuator groove 1135 forming the air chamber 1132, and then irradiating an area of the resin, for example, the both end portions at the entrance and the exit of the actuator groove 1135, with an ultraviolet ray using an exposure mask or the like to avoid curing the resin in unintended regions. Such a liquid-proof wall prevents infiltration of the ink into the air chamber 1132. The air chamber 1132 is fully covered by the nozzle plate 114, and no nozzle 1141 is provided for the air chamber 1132. Therefore, the ink does not inflow into the air chamber 1132.

The nozzle plate 114 is formed to have a plate shape. The nozzle plate 114 can be formed of a flexible film such as a polyimide film. The nozzle plate 114 preferably has a Young's modulus no lower than 9.1 GPa. The nozzle plate 114 is disposed so as to be opposed to one side in the Z direction of the actuator 113. For example, the nozzle plate 114 functions as a pressure damper when the pressure in the pressure chamber 1131 changes. The nozzle plate 114 is fixed to the principal surface of the frame body 112 at the opposite side from the substrate 111 with an adhesive or the like. The nozzle plate 114 has a plurality of nozzles 1141 formed at positions opposed to the plurality of pressure chambers 1131. In the present embodiment, the nozzle plate 114 has two nozzle arrays 1142 each including a plurality of nozzles 1141 arranged in one direction.

The first common flow channel 1161 is formed in the middle between the pair of actuators 113 and at both end portions. The first common flow channel 1161 extends along the longitudinal direction of the actuators 113. The first common flow channel 1161 forms a part of the ink flow channel 16.

The second common flow channels 1162 are formed between the actuators 113 and the frame body 112. The second common flow channels 1162 each form a flow channel of the ink from the openings at the secondary side (the exits) of the plurality of pressure chambers 1131. The second common flow channels 1162 extend along the longitudinal direction of the actuators 113. The second common flow channels 1162 form a part of the ink flow channel 16.

In the liquid ejection head 1, as indicated by arrows in FIG. 6, a flow of ink to the second common flow channels 1162 may occur via the side flow channels depicted in FIG. 6. In such a case, the liquid inflows via the supply opening 1111, then passes outward at both ends of the actuators 113 from the first common flow channel 1161 at the center, and then inflows into the second common flow channels 1162. In other words, the ink supplied from the supply opening 1111 passes through the first common flow channel 1161 as a central flow channel that is closer to the supply opening 1111 and then to the second common flow channels 1162 as side flow channels farther from the supply opening 1111. The ink can thus be supplied to the actuator grooves 1135 forming the pressure chambers 1131 from both Y direction sides.

Specifically, the entrance of the actuator groove 1135 located at the center in the arrangement direction of the side flow channel located across the actuator 113 from the supply opening 1111 is the entrance of the actuator groove 1135 at the farthest position from the supply opening 1111.

When a thickness in the Z direction of the nozzle plate is T mm, then defining a distance along the X direction from the supply part 117 where the liquid is supplied to the second common flow channel 1162 to the farthest actuator groove 1135 as a maximum supply distance L (in mm) and a width dimension in the Y direction of the second common flow channel 1162 as a flow channel width W (in mm), the relationship between L, T, and W satisfies the following Formula 1:

$$L \geq (-372.02\,T + 26.0415)\,W^2 + (47.616\,T - 4.7618)\,W + 7.1429$$

It should be noted that as shown in FIG. 5, when the cross-sectional shape of the second common flow channel 1162 has a width which changes along the depth (Z) direction, the width dimension W in the Y direction of the cross-sectional shape can be defined in this context as the width dimension of the second common flow channel 1162 at the nozzle plate 114.

For example, when the supply opening 1111 is disposed at a separate from the second common flow channel 1162, the supply part 117 can be set to an end portion at the primary side of the second common flow channel 1162. Specifically, a communication (connecting) portion which is an end portion of the actuator 113 in the X direction and forms an entrance where the liquid inflows into the second common flow channel 1162 is set as the supply part 117, and the maximum supply distance L becomes the distance from that supply part 117 to the actuator groove 1135 at the farthest position any other supply part 117.

The individual electrodes apply the drive voltages individually to the plurality of piezoelectric bodies 1133 which are the drive elements. The individual electrodes can be used to deform the respective corresponding pressure chambers 1131. The individual electrode is formed of a wiring pattern provided on the substrate 111 and a wiring pattern provided on the actuator 113.

The common electrode applies the same drive voltage to all of the plurality of piezoelectric bodies 1133. The common electrode can be used to deform the plurality of pressure chambers 1131 all at the same time if needed. The common electrode is formed of a wiring pattern provided on the substrate 111 and a wiring pattern provided on the actuator 113.

The electrodes (individual and common electrode) of each actuator 113 are coupled to a circuit board which is disposed inside the cover 15. A driver IC is mounted on the circuit board. For example, the circuit board supplies drive voltages to the wiring patterns of the actuator 113 with the driver IC to thereby increase or decrease the volumes of particular pressure chambers 1131 to eject droplets from the nozzles 1141.

The manifold unit 12 comprises the manifold 121 and ink supply tubes 123. The manifold unit 12 may further include a cooling water supply tube and a cooling water discharge tube.

The manifold 121 has a plate shape or a block shape. The manifold 121 can be formed from multiple sub-components assembled together. The manifold 121 forms supply channels 1211 and the cooling flow channel.

For example, the manifold 121 is provided with supply channels 1211 which connect with the supply opening 1111 of the substrate 111. It should be noted that the manifold 121 in this example is coupled to a pair of head main bodies 11, and therefore has a pair of the supply channels 1211.

One surface of the manifold 121 is fixed to the substrate 111. Further, in the manifold 121, a top can be disposed on an opposite surface from the substrate 111. Further, the ink supply tubes 123 can be fixed to the manifold 121 via the top plate.

The supply channels 1211 couple (fluidly connect) the ink supply tubes 123 to the supply openings 1111 of the substrate 111. The supply channels 1211 are flow channels for fluid (ink) between the ink supply tubes 123 and the supply openings 1111.

The ink supply tubes 123 are coupled to the supply channels 1211. In the present embodiment, since the liquid ejection head 1 is provided with a pair of head main bodies 11, a pair of the ink supply tubes 123 are disposed for each of the head main bodies 11.

The cover 15 is provided with, for example, a shell body which covers side surfaces of the pair of head main bodies 11 and the manifold unit 12, and a mask plate which covers a part of the nozzle plate 114.

The shell body exposes the ink supply tubes 123 coming out of the manifold unit 12 to the outside.

The mask plate covers regions corresponding to the pair of head main bodies 11 excepting for the plurality of nozzles 1141 and the area near the plurality of nozzles 1141.

The liquid ejection head 1 configured as described above has the plurality of individual electrodes capable of individually applying the drive voltages to the respective piezoelectric bodies 1133, and the common electrode capable of applying the drive voltage to all of the piezoelectric bodies 1133 in the head main bodies 11.

Therefore, it is possible for the liquid ejection head 1 to selectively, individually, or in groups drive the plurality of pressure chambers 1131. When a pressure chamber 1131 is driven, the pressure chamber 1131 deforms in the shear mode, and the ink inside of the pressure chamber 1131 is pressurized. Therefore, it is possible for the liquid ejection head 1 to selectively eject the ink from a nozzle 1141 connected to the pressure chamber 1131.

The liquid ejection head 1 cools the head main bodies 11 with cooling water flow through the manifold unit 12 or the like.

The liquid ejection device 2 incorporating a liquid ejection head 1 will be described with reference to FIG. 7. The liquid ejection device 2 is provided with a chassis 2111, a medium supply unit 2112, an image forming unit 2113, a medium discharge unit 2114, a conveyance device 2115 as a support device, a maintenance device 2117, and a control unit 2118. Further, the liquid ejection device 2 is provided with a cooling device which adjusts the temperature of the ink to be supplied to the liquid ejection heads 1.

The liquid ejection device 2 is an inkjet printer which conveys and prints images on a sheet P (recording medium). The sheet P is conveyed along a conveyance path 2001 from the medium supply unit 2112 to the medium discharge unit 2114 after passing through the image forming unit 2113. The printing process may be referred to as an image forming processing on the sheet P.

The medium supply unit 2112 is provided with a plurality of paper cassettes 21121. The image forming unit 2113 has a support unit 2120 for supporting the sheet during printing and a plurality of head units 2130 disposed above and facing the support unit 2120. The medium discharge unit 2114 is provided with a catch tray 21141.

The support unit 2120 comprises a conveyance belt 21201 having a loop shape, a support plate 21202 for supporting the conveyance belt 21201 from a reverse side, and a plurality of belt rollers 21203 provided at the reverse side of the conveyance belt 21201.

The head unit 2130 is provided with the liquid ejection heads 1 as a plurality of inkjet heads, a plurality of supply tanks 2132 (liquid storage tanks) respectively mounted for the liquid ejection heads 1, pumps 2134 for supplying the ink, and coupling flow channels 2135 for coupling the liquid ejection heads 1 to the supply tanks 2132.

In the present embodiment, liquid ejection heads 1 for four colors, namely cyan, magenta, yellow, and black are provided along with four corresponding supply tanks 2132 for these four colors for containing ink of these respective colors. The supply tanks 2132 are coupled to the liquid ejection heads 1 with the coupling flow channels 2135, respectively.

The pumps 2134 are each a liquid feeding pump formed of, for example, a piezoelectric pump. The pumps 2134 are coupled to the control unit 2118, and are subjected to drive control by the control unit 2118.

The coupling flow channels 2135 are each provided with a supply flow channel to be coupled to the ink supply tubes 123 of the liquid ejection head 1.

The conveyance device 2115 conveys the sheet P along the conveyance path 2001 from a paper cassette 21121 of the medium supply unit 2112 to the catch tray 21141 of the medium discharge unit 2114. The conveyance device 2115 is provided with a plurality of guide plate pairs (guide plate pairs 21211 through 21218) and a plurality of conveying rollers (conveying rollers 21221 through 21228) arranged along the conveyance path 2001. The conveyance device 2115 moves the sheet P relative to the liquid ejection heads 1.

The cooling device 2116 includes a cooling water tank, a cooling flow circuit including piping or tubes for supplying the cooling water, a pump for supplying the cooling water, a cooling unit for controlling the temperature of the cooling water, and the like. The cooling device 2116 supplies the cooling water from the cooling water tank to the cooling flow channel inside the manifold via the cooling circuit using the pump and collects the water discharged through the cooling flow path in the manifold. The cooling water in the cooling water tank may be temperature controlled (adjusted) to a predetermined temperature by the cooling unit. The cooling unit can be, for example, a chiller or heat exchanger.

The maintenance device 2117 suctions ink left on outer surfaces of the nozzle plates 114 during a maintenance operation or the like. Further, when the liquid ejection heads 1 are of the noncyclic (non-circulating) type, the maintenance device 2117 collects ink inside the head main bodies 11 when performing maintenance. Such a maintenance device 2117 may include a tray, a tank, or the like for retaining the ink (waste ink) thus collected.

The control unit 2118 (a controller) is provided with a CPU 21181, read only memory (ROM) for storing a variety of programs, and a random access memory (RAM) for temporarily storing variable data, image data, and so on, and an interface unit for receiving data from the outside and transmitting data to the outside. The CPU 21181 is an example of a processor or a processing circuit.

According to the liquid ejection heads 1 and the liquid ejection device 2 configured in such a manner, by using nozzle plates as a pressure damper, it is possible to suppress the influence of a water hammer effect. Furthermore, since it can be desirable for a high-productivity (high volume) inkjet head to supply the ink from both sides of the actuator groove 1135 in the ejecting of the ink, the ink can be supplied from the both sides of the groove via the second common flow channels 1162. For a high-productivity inkjet head which can have a high printing speed, drive rate, and large ink supply amount, there is a possibility that the water hammer phenomenon occurs due to a rapid decrease in ink flow rate caused by a rapid decrease in ejection duty from an initially high ejection duty. However, by adopting dimensional arrangement in which the relationship between the distance L (distance in millimeters from the supply opening to the farthest actuator 113 from the supply opening) and the ink flow channel width W (in mm) for a nozzle plate 114 with thickness T (in mm) that satisfies Formula 1 (see above), it is possible to provide the desired ejection performance for all the pressure chambers.

It should be noted that the present disclosure is not necessarily limited to the configuration described above.

In an example, the supply opening 1111 is an elongated hole disposed between a pair of actuators 113, and there is no supply opening for the second common flow channels 1162, but other examples may differ from this arrangement. The shape, the number, and the positions of the supply openings 1111 may be set or varied as appropriate. The supply openings 1111 (through holes) for liquid inflows may be positioned for the common flow channels 1162. For example, supply openings 1111 can be disposed in central portions in the first direction of both second common flow channels 1162. In such a case, the length of the maximum supply distance L can be reduced by up to half. When intervals between supply openings 1111 are reduced, the length L for the ink flow channel is also reduced.

For example, the maximum supply distance L changes in when a supply opening 1111 is provided to the common flow channel 1162. Specifically, the supply part 117 from which liquid is supplied to the common flow channel 1162 can be at the supply opening 1111 provided to the common flow channel 1162 or the end portion of the common flow channel 1162. The maximum supply distance L becomes a half of the distance in the first direction between supply openings 1111 disposed for the same common flow channel 1162 or a half of the distance from the end portion to the supply opening 1111 disposed in the same common flow channel 1162.

Figure 8:
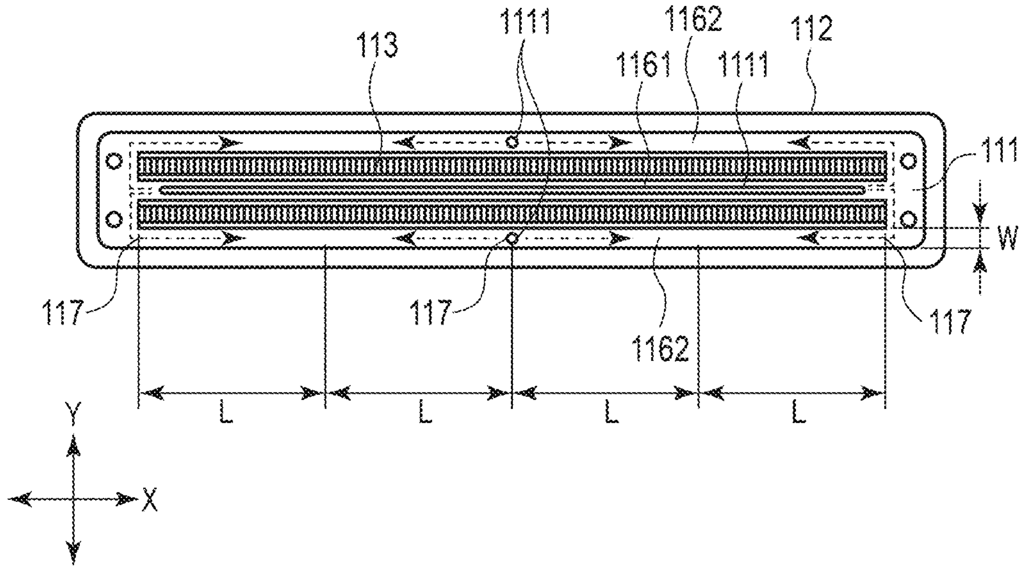
FIG. 8 depicts aspects of a flow channel of a liquid ejection head according to another embodiment.

For example, in another embodiment, as shown in FIG. 8, the supply openings 1111 may be provided at the second common flow channels 1162 in addition to the supply opening 1111 provided for the first common flow channel 1161 at the center. Specifically, for example, when the supply opening 111 and the entrance of the farthest actuator groove 1135 are disposed in the same common flow channel 1162 as shown in FIG. 8, the supply opening 1111 becomes the supply part 117. For example, in the case of the flow channel configuration in which the supply openings 1111 are disposed at the middle along the length direction of the common flow channels 1162 as shown in FIG. 8, L is half as large as when only two supply parts 117 are at the end portions of the common flow channel 1162 as depicted in FIG. 6. For example, when a supply opening 1111 is located at the center of each second common flow channel 1162, the distance L becomes half as large as when the supply opening 1111 is provided only for the first common flow channel 1161. In a case where the flow channel length from the supply opening 1111 to the farthest actuator groove 1135 may differ in different regions, the relationship between the distance L between the supply opening 1111 (or the supply part 117) and the farthest actuator groove 1135, and the ink flow channel width W can still satisfy Formula 1 (see above). With such embodiments, it is possible to suppress the influence of the water hammer effect on the ink flow channel.

Figure 9:
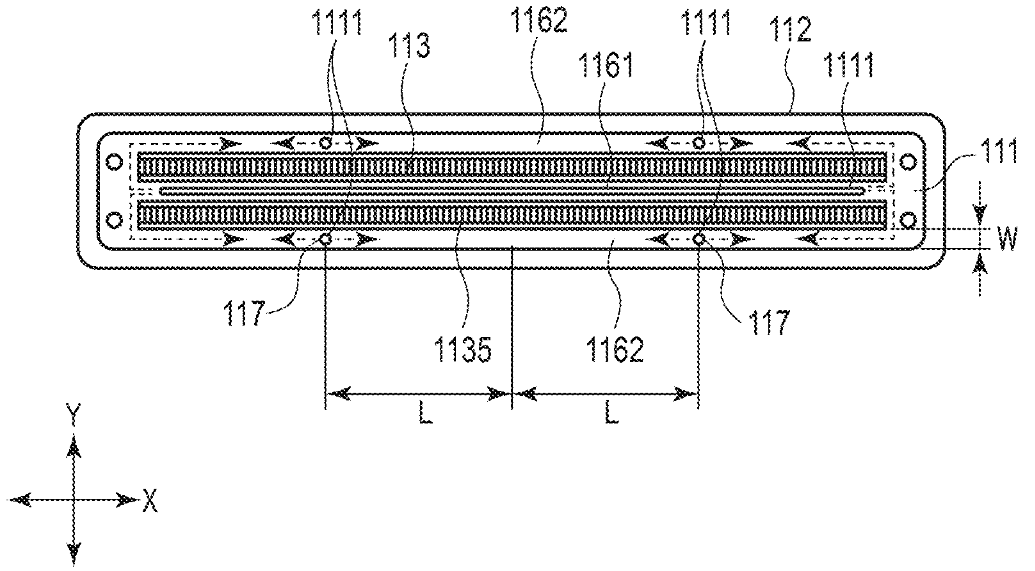
FIG. 9 depicts aspects of a flow channel of a liquid ejection head according to another embodiment.

As still another embodiment, the supply openings 1111 may be disposed at a plurality of places in the common flow channels 1162 as shown in FIG. 9. As described, when the distance from the supply opening 1111 (or the supply part 117 to the farthest actuator groove 1135 differs by regions, the longest distance among the regions can be set as the relevant distance L (distance of measure). For example, in the case of the flow channel configuration shown in FIG. 9, the distance from the supply openings 1111 (at the two places for each common flow channel 1162 to the actuator groove 1135 at the middle position is taken as the distance L as depicted. In the present embodiment depicted in FIG. 9, the relationship between the distance L, the flow channel width W, and the nozzle plate 114 thickness T again satisfies Formula 1 (see above).

Thus, it is possible to suppress the influence of the water hammer effect on the ink flow channel.

In certain examples described above, the inkjet head is of a side-shoot type, in other examples, and an end-shoot type inkjet head may be adopted.

A configuration in which the common flow channels on the both ends of the pressure chambers 1131 are the supply side, and the ink inflows from the both sides can be adopted, but this is not a limitation. It is also possible to adopt an inkjet head in which only one end of the pressure chamber 1131 is the supply side, the other end is the discharge side, such that the ink inflows from the one end of the pressure chamber 1131, and then outflows from the other end. Alternatively, the supply side and the discharge side may be reversed, or may be configured to be switchable.

In an example, the liquid ejection head is of the noncyclic type, but the cyclic type liquid ejection head may be adopted instead. For example, it is possible to adopt a configuration in which the discharge openings are formed in both end portions of the substrate 111, the manifold is provided with a liquid discharge channel connected to the discharge opening of the substrate 111, and a collection flow channel connected to the liquid discharge channel is provided as a coupling flow channel 2135 or the like.

An example in which the cross-sectional shape of the actuator 113 is a trapezoidal shape has been depicted, and the cross-sectional shape of the second common flow channels 1162 in such a case also has a trapezoidal shape with one side tilted, but this is not a limitation. A cross-sectional shape such as a rectangular shape may also be adopted.

The liquid to be ejected is not limited to ink for printing, and in other examples of an inkjet head or liquid ejection head 1, a liquid including conductive particles for forming wiring patterns on a printed wiring board or the like may be ejected.

An inkjet head or liquid ejection head 1 of an embodiment can be used in an inkjet printer, a 3D printer, an industrial manufacturing machine, and for medical devices or purposes. In each such application, aspects of the described embodiments provide advantages for reductions in sizes, weight, and cost as well as the ability to suppress or mitigate the so-called water hammer effect as discussed above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle plate;

a plurality of nozzles in the nozzle plate;

a plurality of actuator grooves forming a plurality of pressure chambers that are respectively fluidly connected to the plurality of the nozzles, the actuator grooves being spaced from one another in a first direction parallel to the nozzle plate;

a common flow channel adjacent to open ends of the actuator grooves in a second direction parallel to the nozzle plate and perpendicular to the first direction; and a liquid supply opening fluidly connected to the common flow channel, wherein the nozzle plate is a flexible film having a Young's modulus equal to or higher than 9.1 gigapascals (GPs), and when a thickness, in millimeters, of the nozzle plate in a third direction orthogonal to the nozzle plate is T, the relationship between a maximum supply distance, in millimeters, L, which is a distance along the first direction in the common flow channel between a supply part, where the liquid is supplied to the common flow channel to a farthest one of the actuator grooves, and a flow channel width, in millimeters, W, where flow channel width is a dimension in the second direction of the common flow channel, satisfies:

$$L \geq (-372.02\,T + 26.0415)\,W^2 + (47.616\,T - 4.7618)\,W + 7.1429.$$

2. The liquid ejection head according to claim 1, wherein the supply part is at an end of the common flow channel in the first direction.

3. The liquid ejection head according to claim 1, wherein the common flow channel has a plurality of supply parts.

4. The liquid ejection head according to claim 3, wherein a first supply part in the plurality of supply parts is at a first end of the common flow channel in the first direction, and a second supply part in the plurality of supply parts is at a second end of the common flow channel in the first direction opposite of the first end.

5. The liquid ejection head according to claim 4, wherein a third supply part in the plurality of supply parts is at an intermediate position between the first and second ends of the common flow channel in the first direction.

6. The liquid ejection head according to claim 5, wherein a fourth supply part in the plurality of supply parts is at another intermediate position between the first and second ends of the common flow channel in the first direction.

7. The liquid ejection head according to claim 5, wherein the intermediate position is halfway between the first and second ends.

8. A liquid ejection head, comprising:

a nozzle plate;

a first plurality of nozzles in the nozzle plate arranged along a first direction;

a second plurality of nozzles in the nozzle plate arranged along the first direction, the second plurality of nozzles being spaced from the first plurality of nozzles in a second direction perpendicular to the first;

a first plurality of actuator grooves forming a first plurality of pressure chambers that are respectively fluidly connected to the first plurality of the nozzles, the actuator grooves in the first plurality of actuator grooves being spaced from one another in the first direction;

a second plurality of actuator grooves forming a second plurality of pressure chambers that are respectively fluidly connected to the second plurality of the nozzles, the actuator grooves in the second plurality of actuator grooves being spaced from one another in the first direction;

a central common flow channel between the first plurality of pressure chambers and the second plurality of pressure chambers in the second direction;

a first outer common flow channel adjacent to open ends of the actuator grooves of the first plurality of actuator grooves in the second direction;

a second outer common flow channel adjacent to open ends of the actuator grooves of the second plurality of actuator grooves in the second direction, the central common flow channel being between the first and second outer common flow channels in the second direction; and a liquid supply opening fluidly connected to the central common flow channel, wherein the central common flow channel is fluidly connected to the first and second outer common flow channels, the nozzle plate is a flexible film having a Young's modulus equal to or higher than 9.1 gigapascals (GPs), and when a thickness, in millimeters, of the nozzle plate in a third direction orthogonal to the nozzle plate is T, the relationship between a maximum supply distance, in millimeters, L, which is a distance along the first direction in the first or second outer common flow channel between a supply part, where the liquid is supplied to the first or second outer common flow channel to a farthest one of the actuator grooves in the respective first or second plurality of actuator grooves, and a flow channel width, in millimeters, W, where flow channel width is a dimension in the second direction of the first or second outer common flow channel, satisfies:

$$L \geq (-372.02\,T + 26.0415)\,W^2 + (47.616\,T - 4.7618)\,W + 7.1429.$$

9. The liquid ejection head according to claim 8, wherein the first outer common flow channel has a plurality of supply parts.

10. The liquid ejection head according to claim 9, wherein a first supply part in the plurality of supply parts is at a first end of the first outer common flow channel in the first direction, and a second supply part in the plurality of supply parts is at a second end of the first outer common flow channel in the first direction opposite of the first end.

11. The liquid ejection head according to claim 10, wherein a third supply part in the plurality of supply parts is at an intermediate position between the first and second ends of the first outer common flow channel in the first direction.

12. A liquid ejection device, comprising:

a sheet conveying device;

an inkjet head configured to eject liquid onto a sheet conveyed by the sheet conveying device, the inkjet head including:

a nozzle plate;

a plurality of nozzles in the nozzle plate;

a plurality of actuator grooves forming a plurality of pressure chambers that are respectively fluidly connected to the plurality of the nozzles, the actuator grooves being spaced from one another in a first direction parallel to the nozzle plate;

a common flow channel adjacent to open ends of the actuator grooves in a second direction parallel to the nozzle plate and perpendicular to the first direction; and a liquid supply opening fluidly connected to the common flow channel, wherein the nozzle plate is a flexible film having a Young's modulus equal to or higher than 9.1 gigapascals (GPs), and when a thickness, in millimeters, of the nozzle plate in a third direction orthogonal to the nozzle plate is T, the relationship between a maximum supply distance, in millimeters, L, which is a distance along the first direction in the common flow channel between a supply part, where the liquid is supplied to the common flow channel to a farthest one of the actuator grooves, and a flow channel width, in millimeters, W, where flow channel width is a dimension in the second direction of the common flow channel, satisfies:

$$L \geq (-372.02\,T + 26.0415)\,W^2 + (47.616\,T - 4.7618)\,W + 7.1429.$$

13. The liquid ejection device according to claim 12, wherein the supply part is at an end of the common flow channel in the first direction.

14. The liquid ejection device according to claim 12, wherein the common flow channel has a plurality of supply parts.

15. The liquid ejection device according to claim 14, wherein a first supply part in the plurality of supply parts is at a first end of the common flow channel in the first direction, and a second supply part in the plurality of supply parts is at a second end of the common flow channel in the first direction opposite of the first end.

16. The liquid ejection device according to claim 15, wherein a third supply part in the plurality of supply parts is at an intermediate position between the first and second ends of the common flow channel in the first direction.

17. The liquid ejection device according to claim 16, wherein the intermediate position is halfway between the first and second ends.

* * * * *